(12) United States Patent
Fresko et al.

(10) Patent No.: US 6,349,312 B1
(45) Date of Patent: Feb. 19, 2002

(54) METHOD AND APPARATUS FOR PERFORMING PRE-ALLOCATION OF MEMORY TO AVOID TRIGGERING GARBAGE COLLECTION OPERATIONS

(75) Inventors: Nedim Fresko, San Francisco; Dean R. E. Long, Boulder Creek, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/360,187

(22) Filed: Jul. 23, 1999

Related U.S. Application Data
(60) Provisional application No. 60/094,007, filed on Jul. 24, 1998.

(51) Int. Cl.[7] ............................................... G06F 12/02
(52) U.S. Cl. ........................ 707/205; 711/170; 711/173; 707/206
(58) Field of Search ................................. 711/170, 173; 710/240, 124, 117; 709/104, 102, 107; 707/206, 205

(56) References Cited

U.S. PATENT DOCUMENTS

| | | | |
|---|---|---|---|
| 5,689,707 A | * 11/1997 | Donnelly | ...................... 707/206 |
| 5,790,852 A | 8/1998 | Salm | .......................... 709/104 |
| 6,130,759 A | * 10/2000 | Blair | .......................... 358/1.17 |

FOREIGN PATENT DOCUMENTS

EP 0 473 802 A 3/1992

* cited by examiner

*Primary Examiner*—B. James Peikari
(74) *Attorney, Agent, or Firm*—Hickman Palermo Truong & Becker LLP; Bobby K. Truong

(57) ABSTRACT

The present invention provides a mechanism for enabling memory allocation operations to be deterministic. According to the invention, determinism is achieved by first pre-allocating a contiguous memory space, and then using that memory space to perform subsequent memory allocation operations. Because the subsequent memory allocation operations are performed using memory space that has already been allocated, it is ensured that the allocation operations will not trigger a garbage collection operation. Also, because the pre-allocated memory space is contiguous, there will be no fragmentation concerns. Thus, the present invention eliminates the two major causes of non-constant allocation times. By doing so, the present invention makes it possible to achieve determinism in a dynamic memory allocation system.

24 Claims, 7 Drawing Sheets

METHOD AND APPARATUS FOR PERFORMING PRE-ALLOCATION OF MEMORY TO AVOID TRIGGERING GARBAGE COLLECTION OPERATIONS

This application claims the benefit of U.S. Provisional Application No. 60/094,007, filed Jul. 24, 1998.

BACKGROUND

This invention relates generally to computer systems and more particularly to a method and apparatus for achieving deterministic memory allocation response in a computer system.

In many modern computer systems, memory needed for execution of program components, such as objects, is allocated at run time rather than at compile time. In such systems, whenever an object is created or instantiated during execution, memory is dynamically allocated from a memory heap to accommodate the object. This memory may be used to hold data associated with the object, or to perform operations required by the object. When the memory is no longer needed (for example, when the object becomes obsolete), the memory is released back to the heap to be used for other objects. Different methodologies is exist for releasing memory back to a memory heap. A common methodology is known as garbage collection (GC).

With GC, the release of memory back to a memory heap is system controlled. That is, the user (i.e. the application developer) controls when an object is instantiated, and hence, when memory is allocated, but it is the underlying system that controls when memory is de-allocated and released back to the heap. Typically, a GC operation is triggered when the amount of free memory space in the heap drops below a certain threshold. This determination is typically made at the time of allocating memory for a new object instance. Thus, a memory allocation operation may (but does not always) trigger a GC operation. When triggered, the GC mechanism typically performs a trace to determine which object instances can be reached by the current program. All of the memory spaces associated with such object instances are marked as active and are preserved. All of the other memory spaces (presumably associated with objects that are no longer reachable by the current program, and hence are obsolete) are recaptured and released back to the heap. In this manner, the GC mechanism collects the "garbage" memory spaces and returns them to the heap.

As noted above, a memory allocation operation may trigger a GC operation. Because of this possibility, the time needed to perform a memory allocation may vary greatly from allocation to allocation. To illustrate, suppose that when a first memory allocation request is processed, the free space available in the heap is above a certain GC threshold; thus, no GC operation is needed. As a result, this first allocation is performed in an X amount of time. Suppose, however, that when a subsequent memory allocation request is processed, the free space available in the heap has dropped below the threshold. In that case, a GC operation will have to be performed before the subsequent memory allocation can be carried out. Thus, the time needed to perform the subsequent memory allocation will be X+GCT, where GCT is the time required to perform the GC operation. Because GCT is substantial relative to X, the time difference between the two memory allocation operations is very significant.

While the triggering of a GC operation is a major factor in causing memory allocation times to vary, it is not the only factor. Other factors such as memory fragmentation can also contribute to the variance. If the memory in a heap is contiguous, it takes less time to allocate memory than if the heap were highly fragmented. Thus, the degree of fragmentation of the heap can affect allocation times. These and other factors can cause memory allocation times to vary from allocation to allocation.

In some implementations, it is important for memory allocation operations to be deterministic, that is, to take substantially the same amount of time each time the operation is performed, or to at least have the allocation times be predictable. For example, in a real-time implementation, it is imperative for memory allocations to be deterministic. Because of the potential for great variations in memory allocation times, the typical allocation-garbage collection mechanism cannot be used in such implementations. Consequently, an improved mechanism is needed.

SUMMARY OF THE INVENTION

The present invention provides a mechanism for enabling memory allocation operations to be deterministic. The present invention is based, at least partially, upon the observation that determinism may be achieved by first pre-allocating a contiguous memory space, and then using that memory space to perform the actual memory allocation operations. Because the memory allocation operations are performed using memory space that has already been allocated, it is ensured that the allocation operations will not trigger a GC operation. Also, because the pre-allocated memory space is contiguous, there will be no fragmentation concerns. Thus, the present invention eliminates the two major causes of non-constant allocation times. By doing so, the present invention makes it possible to achieve determinism in a dynamic memory allocation system.

DETAILED DESCRIPTION OF THE EMBODIMENT(S)

Figure 1:
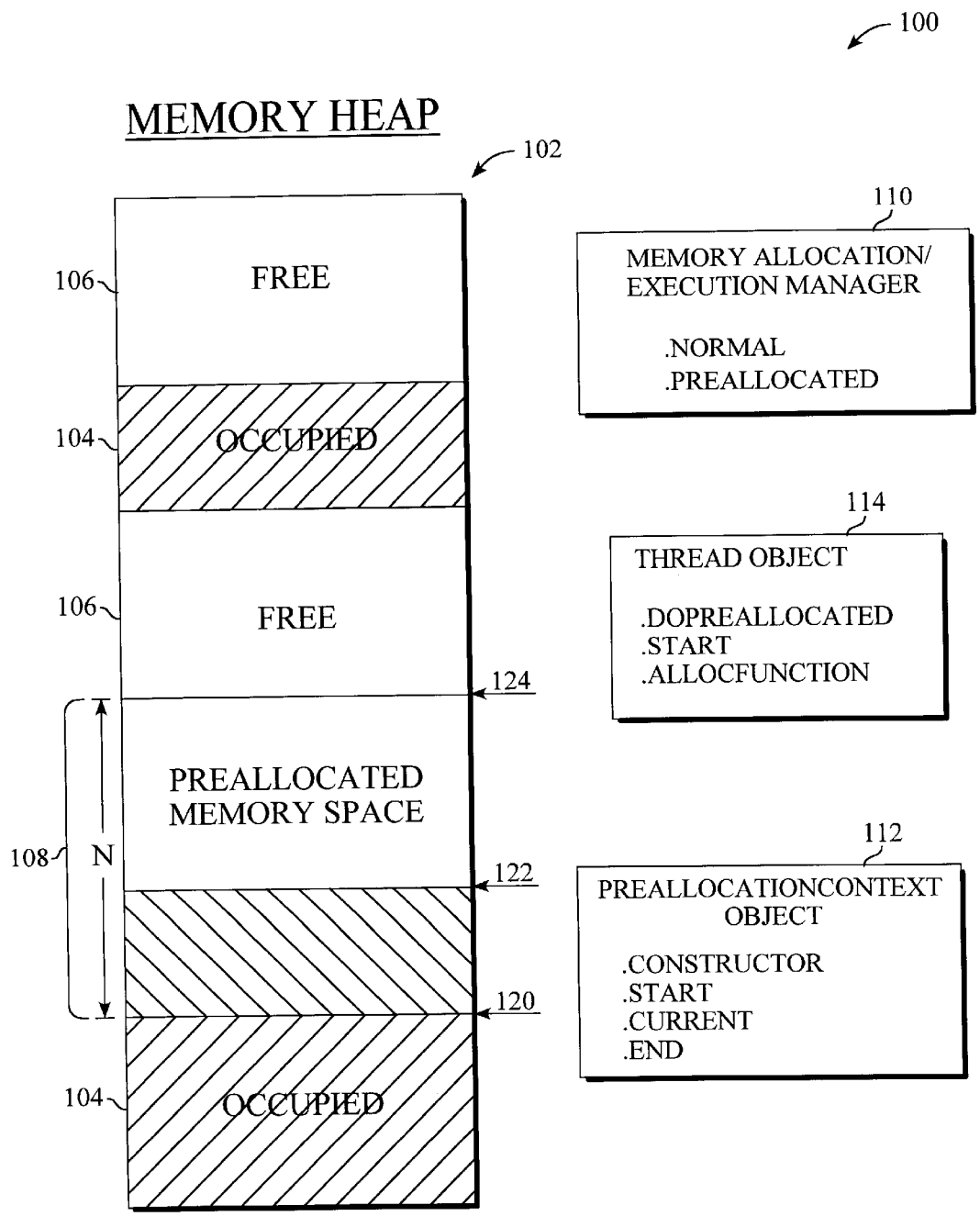
FIG. 1 is a logical block diagram of a dynamic memory allocation system in which the present invention may be implemented.

With reference to FIG. 1, there is shown a logical block diagram of a dynamic memory allocation system 100 in which the present invention may be implemented. For purposes of illustration, the invention will be described below with reference to a system based upon the Java™ programming/execution environment developed by Sun Microsystems, Inc. of Mountain View, Calif. However, it should be noted that the present invention is not so limited but instead may be applied effectively to other platforms and systems.

As shown in FIG. 1, system 100 comprises a memory heap 102 for accommodating dynamic memory allocations during program execution. The memory heap 102 represents all of the dynamic memory space that is globally available for use by program execution units, such as objects. THE memory heap 102 may have portions 104 which are occupied (i.e. portions which are Currently being used by objects) and portions 106 which are free and available for allocation to new objects. As new objects are instantiated during program execution, memory space is allocated from the free portions 106 of the heap 102. As old objects become obsolete, their associated occupied memory spaces 104 are released back to the heap 102 for reuse by future new objects. In this manner, the memory in the heap 102 is used and reused to accommodate dynamic memory allocation. In addition to the free 106 and occupied 104 portions, the memory heap 102 may further comprise one or more preallocated memory spaces 108. As will be explained further below, this preallocated memory space 108 may be used to achieve deterministic memory allocations in accordance with the present invention.

Management of the heap 102 is carried out by the memory allocation/execution manager 110. Specifically, manager 110 controls the allocation of memory from the heap 102, and the release of memory back to the heap 102. In one embodiment, release of memory back to the heap 102 is carried out by way of a GC operation. In addition to controlling the heap 102, manager 110 also manages the overall operation and execution flow of the system 100. In one embodiment, the manager 110 takes the form of a Java™ virtual machine (Java™ VM), such as that described, for example, in *The Java™ Virtual Machine Specification, Second Edition*, by Tim Lindholm and Frank Yellin, Addison-Wesley, 1999, which is incorporated herein by this reference.

For purposes of managing the heap 102, the manager 110 comprises at least two functions which may be invoked to perform memory allocations: (1) a "Normal" allocation function; and (2) a "Preallocated" allocation function. Under the Normal function, memory is allocated to new objects from the free space 106 on the heap 102. This is a typical memory allocation, and as with typical allocations, it can trigger a GC operation if the free space on the heap is below a certain threshold. With the Preallocated function, on the other hand, memory is allocated not from the free space 106 on the heap 102 but rather from the preallocated memory space 108. Since this type of allocation is performed on memory space 108 that has already been allocated, it is guaranteed not to trigger a GC operation. As described in greater detail below, the Preallocated function is used in the present invention to achieve deterministic memory allocation response.

System 100 further comprises a PreallocationContext object 112. This object provides a means for referencing one or more of the preallocated memory spaces 108 on the heap. In one embodiment, when the PreallocationContext object 112 is instantiated, the constructor of the object 112 causes a contiguous set of memory space 108 having a size N (the size N is specified at the time the object 112 is instantiated) to be allocated on the heap. Once preallocated, this memory space 108 may be used to perform subsequent memory allocations which are guaranteed not to trigger GC operations. At this point, it should be noted that the act of allocating the preallocated memory space 108 may cause a GC operation if the free space 106 on the heap 102 is below a certain threshold level. However, once the preallocated memory space 108 is allocated, then all subsequent allocations within the preallocated memory space 108 are guaranteed not to trigger a GC operation.

As to attributes, the PreallocationContext object 112 comprises a start pointer, a current pointer, and an end pointer. The start pointer points to the beginning 120 of the preallocated memory space 108 associated with the object 112, the end pointer points to the end 124 of the preallocated memory space 108, and the current pointer points to the location 122 up to which memory has been allocated. The space between the start pointer and the current pointer represents space which has been allocated to objects. The space between the end pointer and the current pointer represents free space which may be used to satisfy future memory allocation requests. When the object 112 is first instantiated, the start pointer and current pointer point to the same location 120 since no allocations have yet been performed.

System 100 further comprises a Thread object 114 which represents an abstraction of an actual thread of execution. When the Thread object 114 is instantiated and its Start method is invoked, the Thread object 114 is associated with an actual thread of execution, and the Thread object 114 is used thereafter to maintain all of the context information associated with that thread of execution. The Thread object 114 has a plurality of methods and attributes associated therewith. These include an AllocFunction attribute and a DoPreallocated method.

The AllocFunction attribute specifies which memory allocation function the memory allocation manager 110 should use when performing memory allocations for this thread of execution. If the AllocFunction attribute is set to "Normal", then the manager 110 will use the Normal function to allocate memory for this thread. If the AllocFunction attribute is set to "Preallocated", then the manager 110 will use the Preallocated function to allocate memory for this thread.

The DoPreallocated method is invoked when it is necessary to achieve deterministic memory allocation behavior in a subsequent action. More specifically, the DoPreallocated method guarantees that all memory allocations performed in association with the subsequent action will be performed without triggering a GC operation and without suffering from fragmentation effects. Thus, the allocations are performed in substantially constant time. In one embodiment, the DoPreallocated method is a static method (meaning that it is tied to the Thread object class as opposed to a specific Thread object instance), and it takes in two parameters: (1) a Size parameter; and (2) an Action parameter. The Size parameter specifies the size of the preallocated memory space 108 that should be allocated when the PreallocationContext object 112 is instantiated. The Action parameter provides an entry point to a set of code which is to be executed. The DoPreallocated method ensures that while that set of code is executed, all memory allocations are made from the preallocated memory space 108. With all memory allocations being made from the preallocated memory space 108, no GC operations will be invoked, and no fragmentation effects will be felt. Thus, substantially constant time allocation, and hence determinism, is achieved in the memory allocation process.

Figure 2:
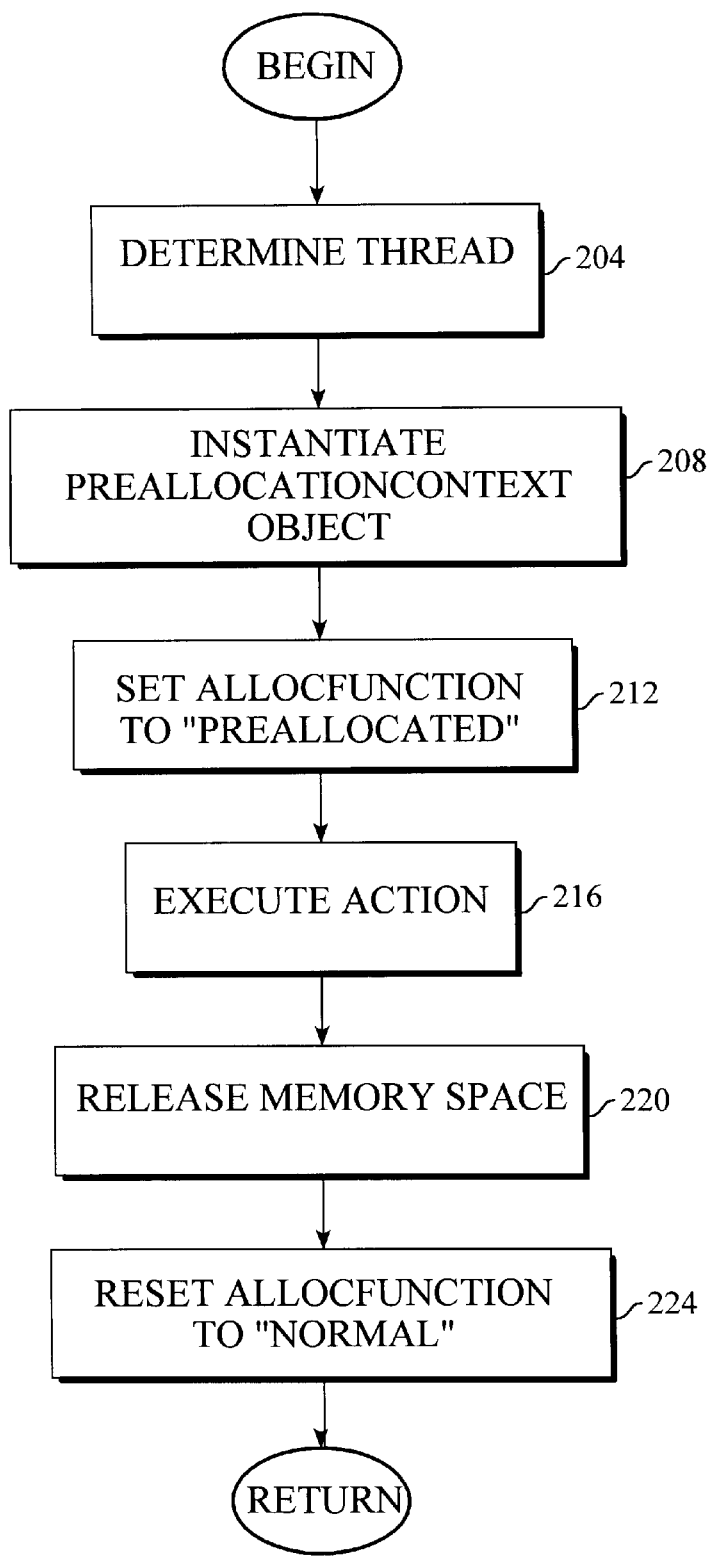
FIG. 2 is a flow diagram illustrating the operation of the DoPreallocated method of the Thread object in accordance with one embodiment of the present invention.
Figure 3:
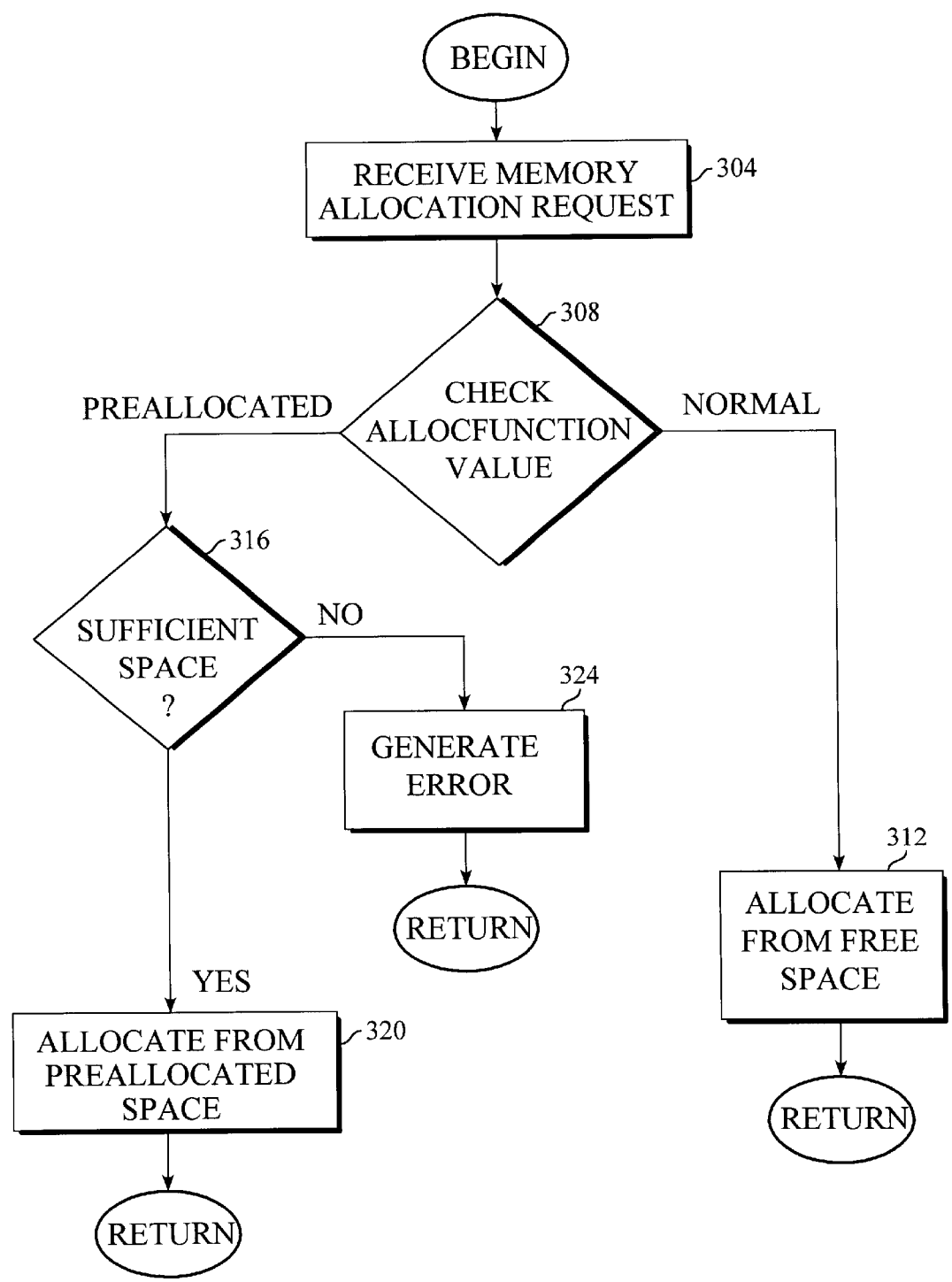
FIG. 3 is a flow diagram illustrating the operation of the allocation manager in response to a memory allocation request in accordance with one embodiment of the present invention.

With reference to the system diagram of FIG. 1 and the flow diagrams of FIGS. 2 and 3, the operation of one embodiment of the present invention will now be described. Initially, suppose that the Thread object 114 has been instantiated and that its Start method has been invoked so that the object 114 has been associated with a thread of execution. Suppose further that that thread of execution has been executing a set of code and that during such execution, the thread encounters a DoPreallocated method call which passes along a size parameter N and an Action parameter AC. This causes the DoPreallocated method of the Thread object class to be invoked. Once invoked, the DoPreallocated method determines (204, FIG. 2) which thread invoked it. In this particular example, it is the thread associated with the Thread object 114. Once that determination is made, the DoPreallocated method instantiates (208) the PreallocationContext object 112, passing along N as the size parameter. During instantiation, the constructor of the PreallocationContext object 112 causes a preallocated memory space 108 having a size N to be allocated on the heap 102. The start and current pointers are set to point to the beginning 120 of the preallocated memory space 108, and the end pointer is set to point to the end 124 of the preallocated memory space 108. The preallocated memory space 108 is now ready for use.

In addition to instantiating the PreallocationContext object 112, the DoPreallocated method also sets (212) the AllocFunction attribute of the Thread object 114 to "Preallocated". This causes the allocation manager 110 to perform all subsequent memory allocations for this thread using the Preallocated allocation function. Once the AllocFunction attribute is set, the DoPreallocated method causes the code referenced by the Action parameter AC to be executed (216). While executing this code, one or more memory allocations will most likely need to be performed. Each time a memory allocation is needed, the allocation manager 110 is invoked.

When invoked, the manager 110 receives (304, FIG. 3) the memory allocation request. It then checks (308) the value of the AllocFunction attribute of the thread that is making the allocation request. If AllocFunction is set to "Normal", then the Normal allocation function is used to perform (312) the memory allocation, in which case, the allocation is made from the free space 106 on the heap 102. Because this is a normal allocation, it may trigger a GC operation. On the other hand, if the AllocFunction attribute is set to "Preallocated" (as is the case in this example), then the allocation manager 110 will use the Preallocated function to perform the memory allocation. Under the Preallocated function, the manager 110 does not allocate memory from the free space 106 but rather from the preallocated memory space 108. As a result, the memory allocation is guaranteed to not cause a GC operation, and to be free of fragmentation effects. By eliminating these two causes of unpredictability, it is possible to achieve deterministic behavior in the memory allocation operation.

In one embodiment, memory allocation in accordance with the Preallocated function is performed as follows. Initially, a determination is made (316) as to whether there is sufficient space in the preallocated memory space 108 to satisfy the memory allocation request. This may be done by comparing the amount of free space (the space between the current pointer 122 and the end pointer 124) in the preallocated memory space 108 with the amount of space requested. If there is not enough free space to satisfy the request, then an "out of memory" error is generated (324). No GC operation is invoked. On the other hand, if there is sufficient space in the preallocated memory space 108 to satisfy the request, then the memory allocation is performed (320) using the preallocated memory space. In one embodiment, memory is allocated from space 108 by incrementing the current pointer of the PreallocationContext object by the amount of space used to fill the memory request. Memory allocation using a preallocated memory space 108 is thus performed.

Referring again to FIG. 2, the set of code referenced by the Action parameter AC continues to be executed until execution is completed. At that point, there is a return to the DoPreallocated method. Upon return, the DoPreallocated method releases (220) its hold on the preallocated memory space 108. In addition, it resets (224) the AllocFunction attribute of the Thread object 114 back to "Normal" so that all subsequent memory allocations made on behalf of this thread will be normal allocations. With the AllocFunction attribute reset to normal, the DoPrecallocated method does a return to the code that called it. The DoPreallocated method is thus completed.

At this point, it should be noted that the present invention has minimal effect on the GC process. Once space within the preallocated memory space 108 is allocated to an object, that space is subject to the regular GC operation. Thus, even though the preallocated memory space 108 ranges from start pointer to end pointer, the space between the current pointer and the start pointer (representing space that has been allocated to objects) can be garbage collected. This is a very advantageous result because it means that the present invention does not need a special memory deallocation mechanism to deallocate memory from the preallocated memory space 108. Instead, the regular GC mechanism may be used. As a result, the present invention achieves deterministic behavior with minimal additional overhead.

Figure 4:
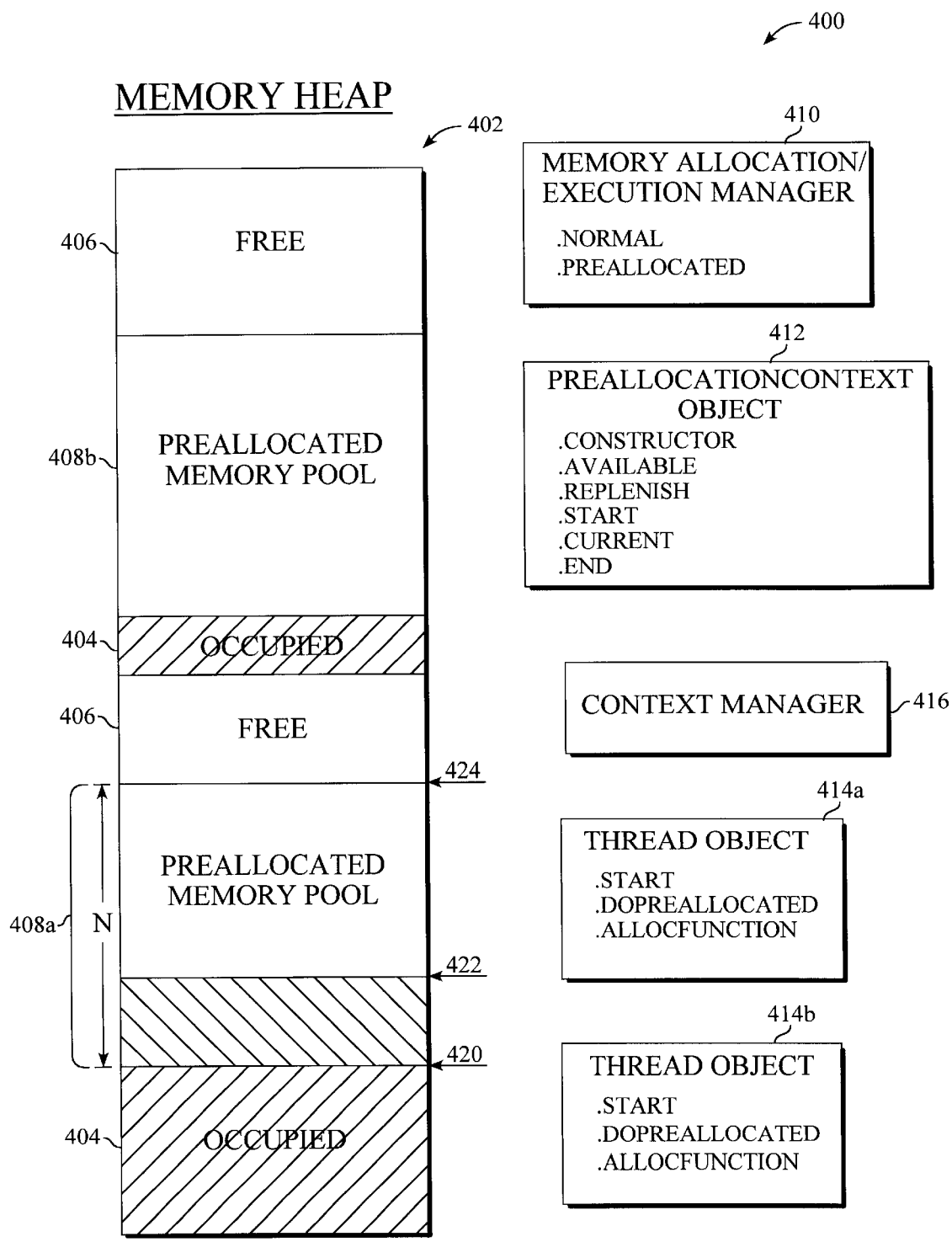
FIG. 4 is a logical block diagram of a multi-threaded dynamic memory allocation system in which the present invention may be implemented.

Thus far, the invention has been described in the context of a single-threaded system. It should be noted, however, that with certain enhancements, the invention may be extended to multi-threaded systems. FIG. 4 shows a logical block diagram of a multi-threaded system 400 in which the present invention may be implemented.

The system 400 first comprises a memory heap 402 representing all of the dynamic memory space available for accommodating dynamic memory allocations. As with the heap 102 of FIG. 1, heap 402 comprises occupied spaces 404, free spaces 406, and preallocated spaces 408. However, notice that the preallocated spaces 408 in FIG. 4 are referred to as "pools" as opposed to "spaces". This difference in terminology is intended to highlight the fact that the memory pools 408 in heap 402 may be shared by multiple threads. The sharing of the preallocated memory pools 408 will be described in greater detail in a later section.

System 400 further comprises a memory allocation/execution manager 410 for managing the memory heap 402 and the overall flow of execution of the system 400. Manager 410 is similar in most respects to the manager 110 of FIG. 1. However, manager 410 comprises additional capability for managing multiple threads of execution. In addition, the Preallocated function of manager 410 is enhanced to provide it with additional capability to handle the additional complexity associated with the sharing of a preallocated memory pool 408 by multiple threads. More specifically, because multiple threads are sharing the same pool 408, there may be times when multiple threads are concurrently requesting memory allocations from the same preallocated pool 408. To address this possibility, the Preallocated function of manager 410 comprises capability for performing a mutual exclusion operation on the multiple requests. The mutual exclusion ensures that a memory allocation is preformed on a preallocated pool 408 for only one thread at a time. For purposes of the present invention, the mutual exclusion operation may implement any known mutual exclusion methodology, including but not limited to locks, priority, and arbitration. The Preallocated function of the manager 410 will be described in greater detail in a later section. In one embodiment, the manager 410 takes the form of a Java™ VM.

System 400 further comprises a PreallocationContext object 412. Object 412 is similar to the PreallocationContext object 112 of FIG. 1 in that it comprises a constructor and three pointer attributes (start, current, and end). In addition, though, object 412 further comprises an Available method and a Replenish method. When invoked, the Available method returns a value indicating the amount of space remaining in a current preallocated memory pool 408 associated with the PreallocationContext object 412. This method may be invoked, for example, to determine when to replenish the preallocated memory pool 408.

When it becomes necessary to replenish the pool 408, the Replenish method may be invoked. When invoked, this method causes another preallocated memory pool to be allocated. Note that the Replenish method does not cause the existing preallocated memory pool to be deallocated or released; it simply causes another pool to be preallocated. To illustrate this, suppose that preallocated memory pool 408a is the memory pool currently associated with object 412. Suppose further that the memory space in pool 408a is almost completely consumed so that the Replenish method is invoked. When invoked, the Replenish method causes another memory pool 408b having the same size as pool 408a to be preallocated. Once the new pool 408b is allocated, the start, current, and end pointers are adjusted to point to the new current pool 408b. With that done, the new pool 408b is ready for use. To threads interacting with the PreallocationContext object 412, it appears as if the preallocated memory pool were erased and made available for reuse. In actuality, however, no erase, deallocation, garbage collection, or memory release operation was performed. A new pool 408b was simply created. As this discussion shows, it is possible in the present invention for multiple preallocated memory pools 408a, 408b to be associated with the same PreallocationContext object 412.

As noted previously in connection with the system of FIG. 1, once memory space within a preallocated memory pool is allocated to an object, that memory space is subject to regular GC operations. Thus, eventually, all of the allocated space in the memory pools 408a, 408b will be garbage collected and returned to the heap 402. What will not be garbage collected, however, is the space in each pool 408a, 408b that was not allocated to objects. It will be up to the DoPreallocated method of the Thread objects 414a, 414b to release these spaces, as will be explained below.

The replenishing of the preallocated memory pools 408 is controlled by the context manager 416. In one embodiment, the context manager 416 executes on its own separate thread and is designed to wake at regular intervals to perform upkeep on the memory pools 408. When it wakes, the context manager 416 determines (by invoking the Available method of the PreallocationContext object) whether the available space in the current preallocated memory pool associated with the object 412 has dropped below a certain threshold. If not, then no action is taken. On the other hand, if the available space has dropped below the threshold, then the context manager 416 invokes the Replenish method of the object 412 to cause a new memory pool to be preallocated. In this manner, the context manager 416 prevents the PreallocationContext object 412 from running out of preallocated space.

System 400 further comprises a plurality of Thread objects 414a, 414b, each representing an abstraction of an actual thread of execution. In FIG. 4, for the sake of simplicity, only two Thread objects are shown; however, it should be understood that any number of threads may be accommodated in system 400. For the most part, Thread objects 414a, 414b are similar to the Thread object 114 of FIG. 1. however, there is a difference in the DoPreallocated method of objects 414a, 414b which is worth noting. Rather than taking in a Size parameter as one of the arguments, the DoPreallocated method of objects 414a, 414b takes in a specific PreallocationContext object reference. By taking in a specific PreallocationContext object reference as argument, the DoPrecallocated method of objects 414a, 414b makes it possible for different DoPreallocated method calls from different threads to reference the same PreallocationContext object. As a result, it is possible for multiple threads to share the same PreallocationContext. In addition to taking in a different argument, the implementation of the DoPreallocated method of objects 414a, 414b is also different. This difference will be made clear in the following discussion.

Figure 5:
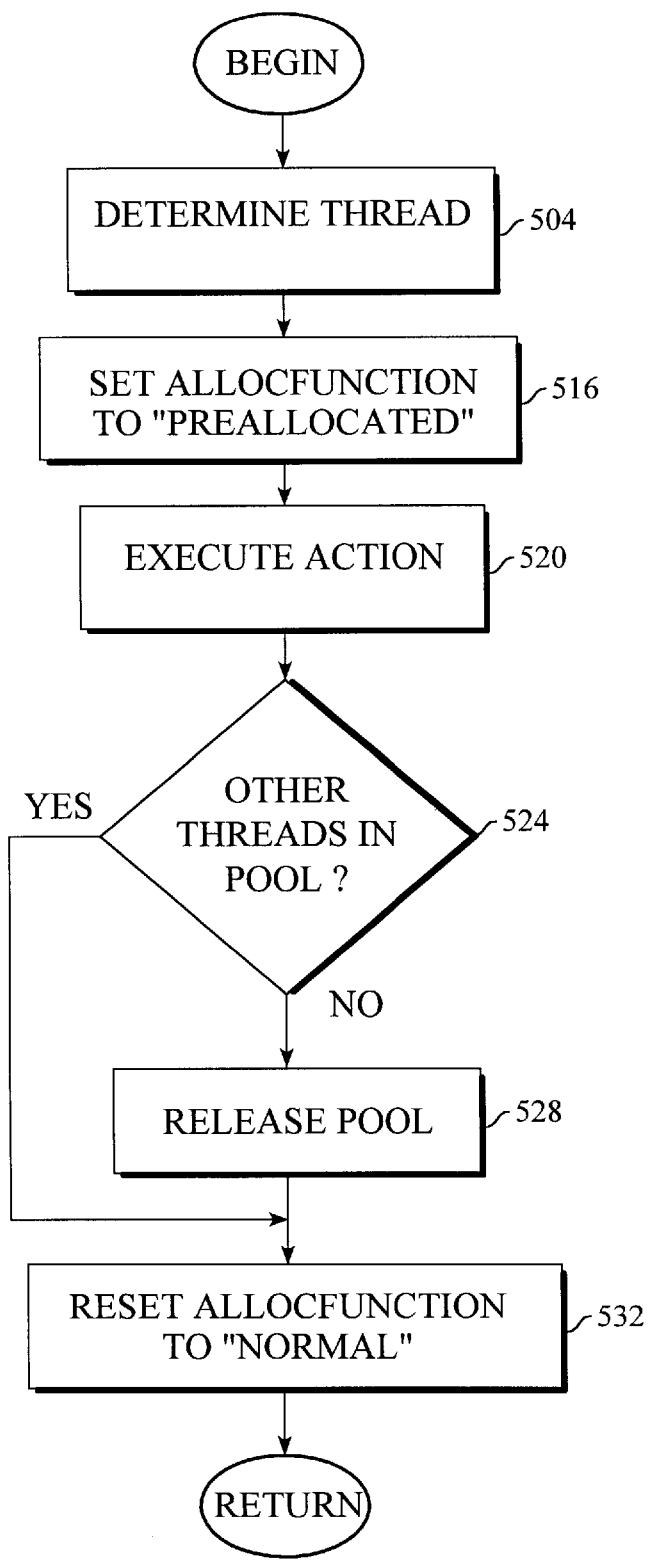
FIG. 5 is a flow diagram illustrating the operation of the DoPreallocated method of the Thread object in accordance with a second embodiment of the present invention.
Figure 6:
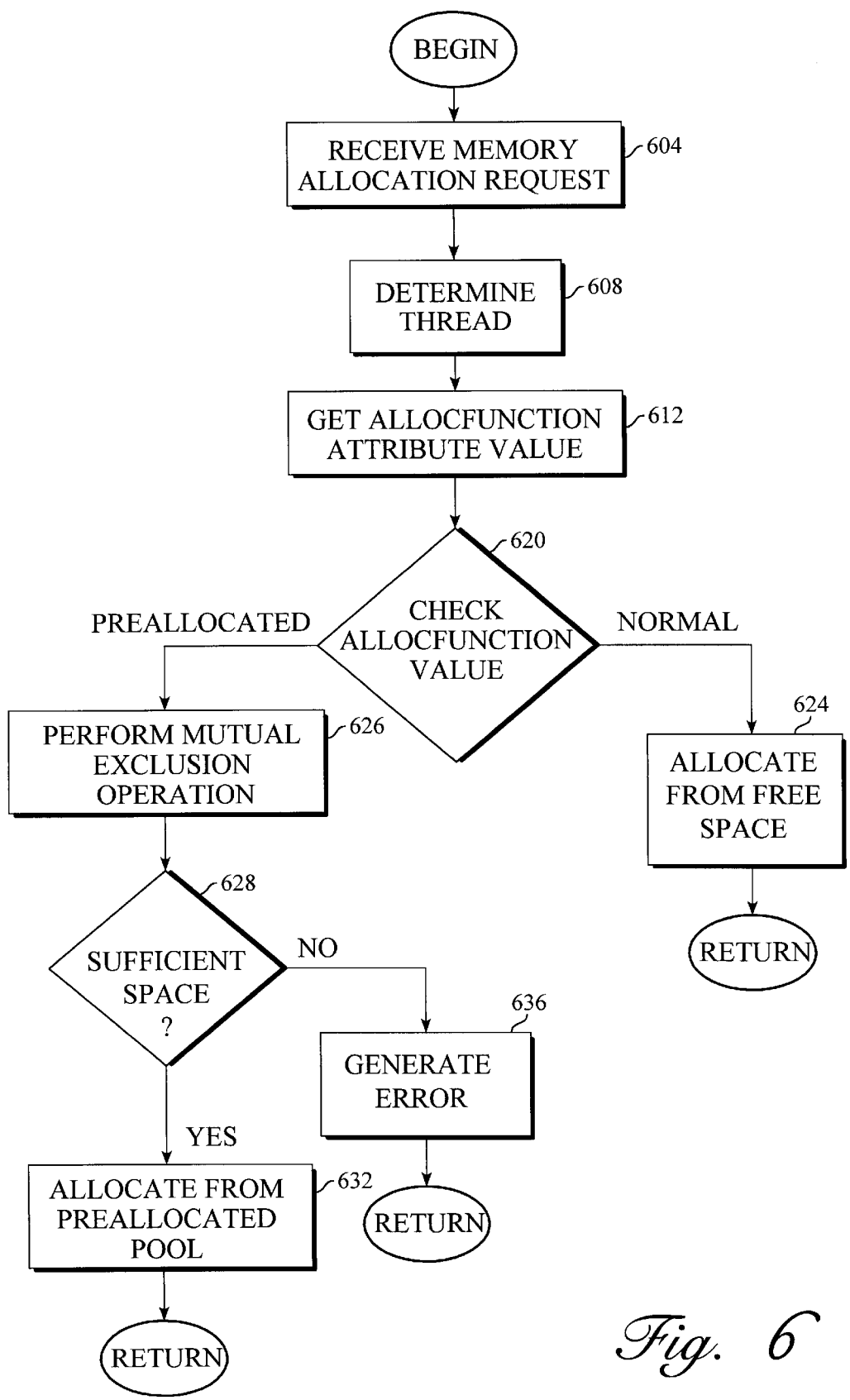
FIG. 6 is a flow diagram illustrating the operation of the allocation manager in response to a memory allocation request in accordance with a second embodiment of the present invention.

With reference to the system diagram of FIG. 4 and the flow diagrams of FIGS. 5 and 6, the operation of the multi-threaded system 400 will now be described. Initially, suppose that the Thread objects 414a, 414b have been instantiated and that their Start methods have been invoked so that they have been associated with actual threads of execution. Suppose further that these threads of execution have been executing sets of code and that during such execution, one of the threads instantiates the PreallocationContext object 412. During instantiation, the constructor of the PreallocationContext object 412 causes a preallocated memory pool 408a having a certain size N to be allocated on the heap 402. The start and current pointers are set to point to the beginning 420 of the preallocated memory space 408a, and the end pointer is set to point to the end 424 of the preallocated memory space 408a. The preallocated memory space 408a is now ready for use.

Now, suppose that in the process of executing code, one of the threads encounters a DoPreallocated method call which passes along a PreallocationContext parameter PC referencing the PreallocationContext object 412, and an Action parameter AC. This causes the DoPreallocated method of the Thread object class to be invoked. Once invoked, the DoPreallocated method determines (504, FIG. 5) which thread invoked it. In this particular example, it will be assumed that it is the thread associated with the Thread object 414a. Once that determination is made, the DoPreallocated method sets (516) the AllocFunction attribute of the Thread object 414a to "Preallocated". This causes the allocation manager 410 to perform all subsequent memory allocations for this thread using the Preallocated allocation function. Once the AllocFunction attribute is set, the DoPreallocated method causes the code referenced by the Action parameter AC to be executed (520). While executing this code, one or more memory allocations will most likely need to be performed. Each time a memory allocation is needed, the allocation manager 410 is invoked.

When invoked, the manager 410 receives (604, FIG. 6) the memory allocation request. It then determines (608) which thread made the allocation request, and gets the AllocFunction value for that thread (612). Once that is done, the manager 410 checks (620) the AllocFunction attribute of that thread. If AllocFunction is set to "Normal", then the Normal allocation function is used to perform the memory allocation, in which case, the allocation is made (624) from the free space 106 on the heap 402. Because this is a normal allocation, it may trigger a GC operation. On the other hand, if the AllocFunction attribute is set to "Preallocated" (as is the case in this example), then the allocation manager 410 will use the Preallocated function to perform the memory allocation. Under the Preallocated function, the manager 410 does not allocate memory from the free space 406 but rather from the preallocated memory pool 408*a* associated with the PreallocationContext specified in the DoPrecallocated method call. As a result, the memory allocation is guaranteed to not cause a GC operation, and to be free of fragmentation effects.

According to the Preallocated function, before memory is allocated from the preallocated memory pool 408*a*, the manager 410 first performs a mutual exclusion operation (626), if necessary. As noted previously, in a multi-threaded system, it is possible for multiple threads to concurrently request a memory allocation from the same PreallocationContext. If that happens, the manager 410 will need to perform a mutual exclusion operation on the multiple requests to ensure that only one request is processed at a time. At this point, it should be noted that if a mutual exclusion operation is performed, the memory allocation time may vary. Despite this variance, though, the allocation time behavior will still be deterministic. To elaborate, suppose that five threads concurrently request a memory allocation from the same PreallocationContext. Usually, the memory allocation operation requires an X amount of time. Because of the contention, however, some of these threads will have to wait, and hence, the memory allocation time will be longer. However, since the present invention guarantees that once a thread gets access to the PreallocationContext, the actual memory allocation operation will require a constant X amount of time, it is known that at worst, the memory allocation time for any of the five threads will be 5X. Thus, even though the wait may cause allocation times to vary, the behavior of the memory allocation mechanism will still be deterministic and predictable. It is this determinism that is usually required in systems such as real time systems.

Once the mutual exclusion operation (if necessary) is performed, memory may be allocated from the preallocated memory pool 408*a*. In one embodiment, memory allocation is performed as follows. Initially, a determination is made (628) as to whether there is sufficient space in the preallocated memory pool 408*a* to satisfy the memory allocation request. This may be done by comparing the amount of free space in the preallocated memory pool 408*a* associated with the PreallocationContext 412 (ascertained by calling the Available method) with the amount of space requested. If there is not enough free space to satisfy the request, then an "out of memory" error is generated (636). No GC operation is invoked. On the other hand, if there is sufficient space in the preallocated memory pool 408*a* to satisfy the request, then the memory allocation is performed using the preallocated memory pool. In one embodiment, memory is allocated from pool 408*a* by incrementing the current pointer of the PreallocationContext object by the amount of space used to fill the memory request. Memory allocation using a preallocated memory pool 408*a* associated with a specific PreallocationContext 412 is thus performed.

Referring again to FIG. 5, the set of code referenced by the Action parameter AC continues to be executed until execution is completed. At that point, there is a return to the DoPreallocated method. Upon return, the DoPreallocated method determines (524) whether any other threads are currently using the memory pool 408*a* from which the DoPreallocated method is exiting. In one embodiment, to enable the DoPreallocated method to make this determination, a reference count is maintained by the PreallocationContext object 412 for each of the preallocation memory pools 408*a*, 408*b* associated with the object 412. Whenever a thread enters a pool 408*a*, 408*b*, the reference count associated with that pool is incremented. Whenever a thread leaves a pool 408*a*, 408*b*, the reference count associated with that pool is decremented. Thus, by determining whether the reference count associated with a pool 408*a*, 408*b* has reached zero, the DoPreallocated method can determine whether any other threads are currently using that pool.

If no other threads are using the pool 408*a* from which the DoPreallocated method is exiting, then the hold on the pool 408*a* is released (528). Thereafter, the DoPreallocated method resets (532) the AllocFunction attribute of the Thread object 414*a* back to "Normal" so that all subsequent memory allocations made on behalf of this thread will be normal allocations. With the AllocFunction attribute reset to normal, the DoPreallocated method does a return to the code that called it. The DoPreallocated method is thus completed.

Hardware Overview

Figure 7:
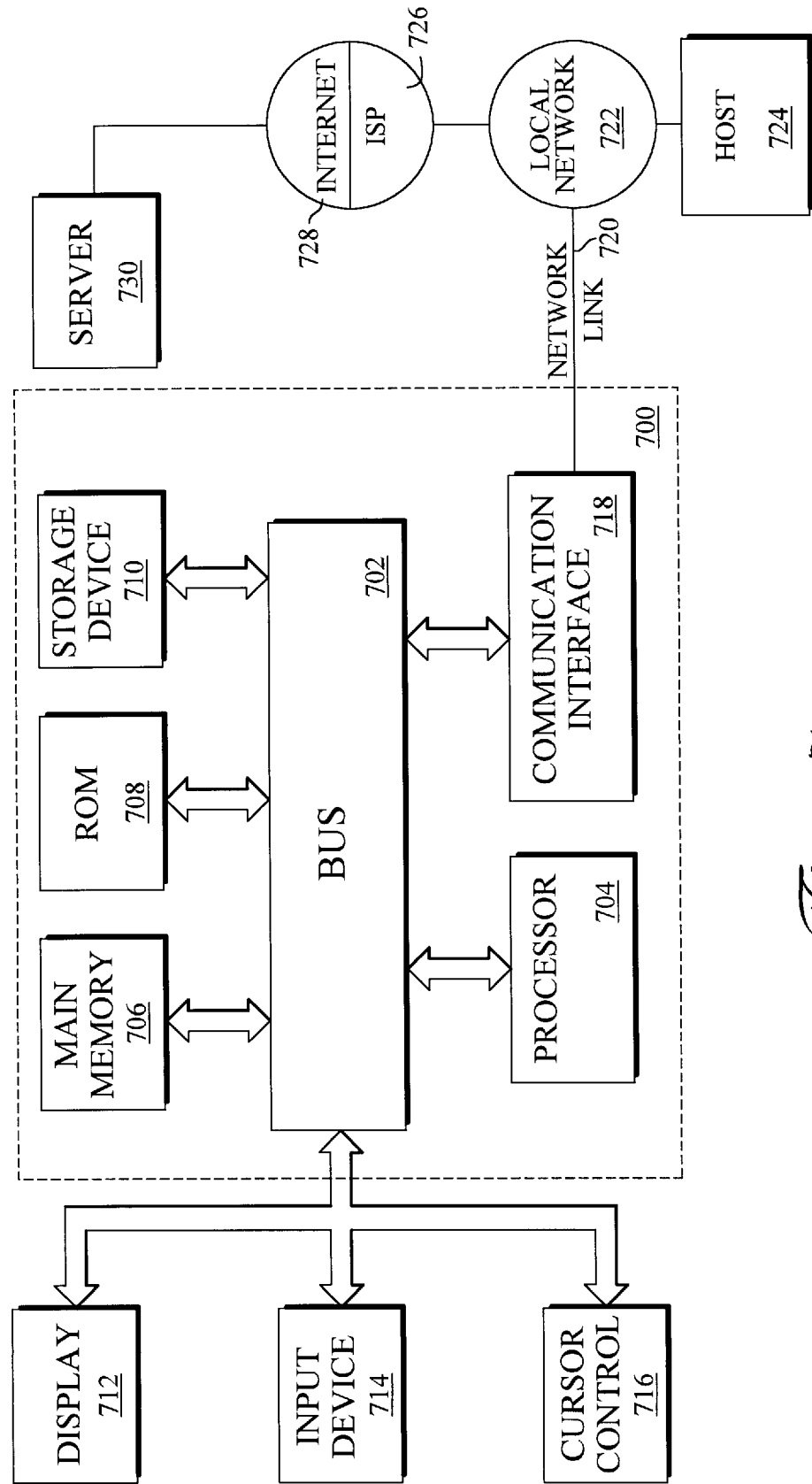
FIG. 7 is a hardware block diagram of a computer system in which the present invention may be implemented.

FIG. 7 is a block diagram that illustrates a computer system 700 in which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. In addition to being used for implementing the heaps 102, 402, main memory 706 also may be further used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

According to one embodiment, the functionality of the present invention is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or electromagnetic waves, such as those generated during radio-wave, infra-a-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using, a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 10 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 100 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution. In this manner, computer system 700 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. In a computer system having a memory heap, the memory heap comprising free space and allocated space, a method for achieving deterministic memory allocation response in the system, comprising:

allocating from free space on the heap a preallocated memory space;

receiving a first memory allocation request from a first thread; and processing said first memory allocation request by allocating memory from said preallocated memory space rather than from the free space on the heap, thereby enabling processing of said first memory allocation request to be performed without triggering a memory reclamation operation.

2. The method of claim 1, wherein said preallocated memory space is contiguous.

3. The method of claim 2, wherein said first request is processed by allocating at least a subset of said preallocated memory space, and wherein said subset, once allocated, is subject to release back to the heap via a garbage collection operation.

4. The method of claim 1, further comprising:

receiving a second memory allocation request from a second thread requesting memory allocation from said preallocated memory space; and processing said second memory allocation request by allocating memory from said preallocated memory space rather than from the free space on the heap.

5. The method of claim 4, wherein said first and second memory allocation requests are received concurrently, and wherein, prior to processing either request, a mutual exclusion operation is performed to determine which request to process first.

6. The method of claim 5, wherein after said mutual exclusion operation is performed, each of said first and second requests are processed in substantially equal amounts of time.

7. The method of claim 4, wherein said first request is processed by allocating a first subset of said preallocated memory space, wherein said second request is processed by allocating a second subset of said preallocated memory space, and wherein said first and second subsets, once allocated, are subject to release back to the heap via a garbage collection operation.

8. The method of claim 4, further comprising:
determining whether available space in said preallocated memory space has dropped below a certain threshold; and
in response to a determination that the available space in the preallocated memory space has dropped below a certain threshold, allocating from the free space on the heap another preallocated memory space for use in processing future memory allocation requests.

9. A computer system capable of achieving deterministic memory allocation response, comprising:
a memory heap comprising free space and allocated space;
a mechanism for allocating from said free space on said heap a preallocated memory space;
a mechanism for receiving a first memory allocation request from a first thread; and
a mechanism for processing said first memory allocation request by allocating memory from said preallocated memory space rather than from said free space on said heap, thereby enabling said first memory allocation request to be processed without triggering a memory reclamation operation.

10. The system of claim 9, wherein said preallocated memory space is contiguous.

11. The system of claim 10, wherein said first request is processed by allocating at least a subset of said preallocated memory space, and wherein said subset, once allocated, is subject to release back to said heap via a garbage collection operation.

12. The system of claim 9, further comprising:
a mechanism for receiving a second memory allocation request from a second thread requesting memory allocation from said preallocated memory space; and
a mechanism for processing said second memory allocation request by allocating memory from said preallocated memory space rather than from said free space on said heap.

13. The system of claim 12, wherein said first and second memory allocation requests are received concurrently, and wherein said system further comprises:
a mechanism for performing a mutual exclusion operation, prior to processing either request, to determine which request to process first.

14. The system of claim 13, wherein after said mutual exclusion operation is performed, each of said first and second requests are processed in substantially equal amounts of time.

15. The system of claim 12, wherein said first request is processed by allocating a first subset of said preallocated memory space, wherein said second request is processed by allocating a second subset of said preallocated memory space, and wherein said first and second subsets, once allocated, are subject to release back to said heap via a garbage collection operation.

16. The system of claim 12, further comprising:
a mechanism for determining whether available space in said preallocated memory space has dropped below a certain threshold; and
a mechanism for allocating, in response to a determination that the available space in the preallocated memory space has dropped below a certain threshold, from said free space on said heap another preallocated memory space for use in processing future memory allocation requests.

17. A computer program product for achieving deterministic memory allocation response in a system having a memory heap, the memory heap comprising free space and allocated space, the computer program product comprising:
code for causing one or more processors to allocate from the free space on the heap a preallocated memory space;
code for causing one or more processors to receive a first memory allocation request from a first thread; and
code for causing one or more processors to process said first memory allocation request by allocating memory from said preallocated memory space rather than from the free space on the heap, thereby enabling processing of said first memory allocation request to be performed without triggering a memory reclamation operation.

18. The computer program product of claim 17, wherein said preallocated memory space is contiguous.

19. The computer program product of claim 18, wherein said first request is processed by allocating at least a subset of said preallocated memory space, and wherein said subset, once allocated, is subject to release back to the heap via a garbage collection operation.

20. The computer program product of claim 17, further comprising:
code for causing one or more processors to receive a second memory allocation request from a second thread requesting memory allocation from said preallocated memory space; and
code for causing one or more processors to process said second memory allocation request by allocating memory from said preallocated memory space rather than from the free space on the heap.

21. The computer program product of claim 20, wherein said first and second memory allocation requests are received concurrently, and wherein said computer program product further comprises:
code for causing one or more processors to perform, prior to processing either request, a mutual exclusion operation to determine which request to process first.

22. The computer program product of claim 21, wherein after said mutual exclusion operation is performed, each of said first and second requests are processed in substantially equal amounts of time.

23. The computer program product of claim 20, wherein said first request is processed by allocating a first subset of said preallocated memory space, wherein said second request is processed by allocating a second subset of said preallocated memory space, and wherein said first and second subsets, once allocated, are subject to release back to the heap via a garbage collection operation.

24. The computer program product of claim 20, further comprising:
code for causing one or more processors to determine whether available space in said preallocated memory space has dropped below a certain threshold; and
code for causing one or more processors to allocate, in response to a determination that the available space in the preallocated memory space has dropped below a certain threshold, from the free space on the heap another preallocated memory space for use in processing future memory allocation requests.

* * * * *